United States Patent [19]

Eubanks

[11] Patent Number: 5,839,826

[45] Date of Patent: Nov. 24, 1998

[54] STIRRING DEVICE FOR A BLENDER HAVING DUAL BLADES

[75] Inventor: Harold Z. Eubanks, Leakesville, Miss.

[73] Assignee: Sunbeam Products, Inc., Delray Beach, Fla.

[21] Appl. No.: 778,144

[22] Filed: Jan. 10, 1997

[51] Int. Cl.⁶ ..................................................... B01F 7/26
[52] U.S. Cl. .......................................... 366/315; 366/343
[58] Field of Search ........................... 366/64–66, 96–99, 366/102–104, 197, 205, 242–252, 262–265, 270, 279, 292, 293, 295, 314, 315–317, 342, 343; 416/181, 228, 227 R, 231 A

[56] References Cited

U.S. PATENT DOCUMENTS

| | | | |
|---|---|---|---|
| 1,606,992 | 11/1926 | Gilchrist | 366/197 |
| 2,254,236 | 9/1941 | Myers | 366/343 X |
| 2,270,480 | 1/1942 | Seyfried | 366/343 X |
| 2,282,866 | 5/1942 | Hagen | 366/205 |
| 2,288,063 | 6/1942 | Ashlock, Jr. | 366/197 X |
| 2,459,224 | 1/1949 | Hendricks | 366/315 X |
| 2,662,754 | 12/1953 | Sharp | 366/197 |
| 2,692,127 | 10/1954 | Conn | 416/181 |
| 2,772,079 | 11/1956 | Ernst | 416/227 X |
| 3,063,685 | 11/1962 | Rommel | 416/181 X |
| 3,139,917 | 7/1964 | Elmore | |
| 3,147,958 | 9/1964 | Stiffler | 416/231 A |
| 3,319,939 | 5/1967 | Rogenski | 416/227 X |
| 3,606,577 | 9/1971 | Conn | 416/181 |
| 3,630,636 | 12/1971 | Hill | 416/181 X |
| 3,658,106 | 4/1972 | Elsasser | |
| 4,004,786 | 1/1977 | Stephens | |
| 4,176,797 | 12/1979 | Kemp | |
| 4,316,584 | 2/1982 | Valbona | |
| 4,462,694 | 7/1984 | Ernster et al. | |
| 4,664,530 | 5/1987 | Kurome et al. | |
| 4,813,787 | 3/1989 | Conn | |
| 5,407,272 | 4/1995 | Meier | |

FOREIGN PATENT DOCUMENTS

4224428 A1  1/1994  Germany .

Primary Examiner—Charles E. Cooley
Attorney, Agent, or Firm—Dennis M. Carleton

[57] ABSTRACT

A blender blade having a bottom wavy or undulate configuration for blending ingredients in a blender and a top aerating blade. The wavy blade stirs ingredients into the mixture, rather than chopping and grinding the ingredients, thereby retaining the ingredients integrity. The top blade pulls ingredients and air into the mixture to be mixed. The resultant mixture has a heterogenous, rather and homogenous, textured consistency.

7 Claims, 3 Drawing Sheets

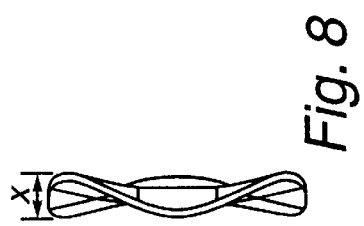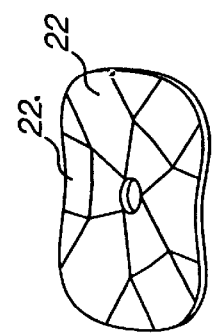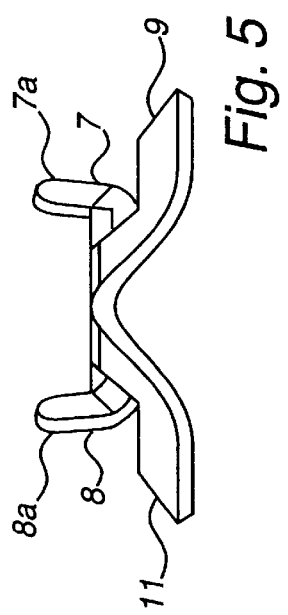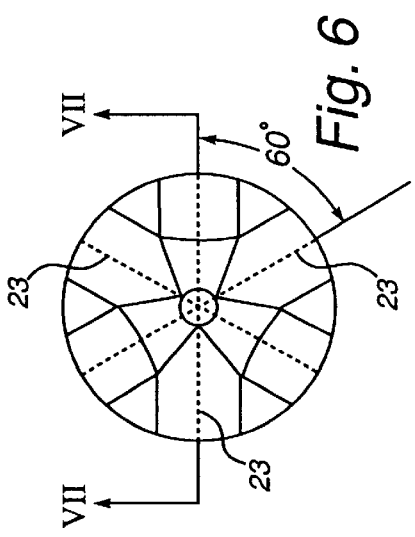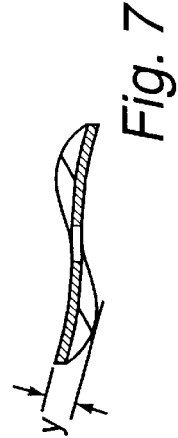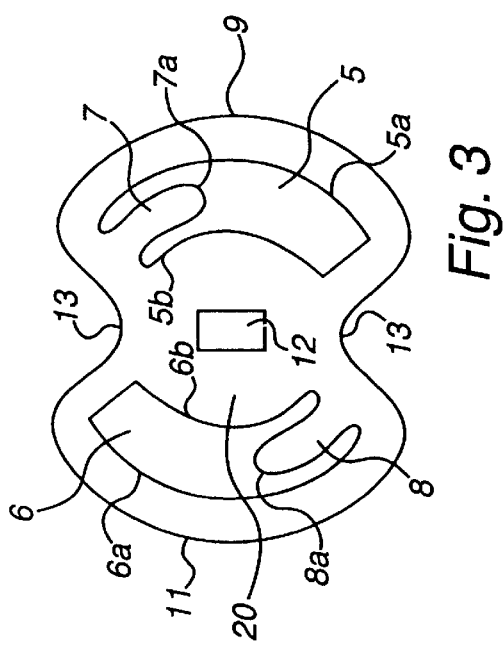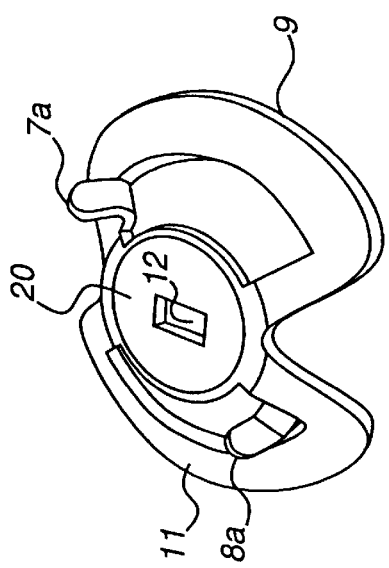

STIRRING DEVICE FOR A BLENDER HAVING DUAL BLADES

FIELD OF THE INVENTION

This invention relates to a blender blade which stirs ingredients into a mixture thereby providing a heterogenous, textured consistency, rather than breaking down ingredients into fine particles.

BACKGROUND OF THE INVENTION

Mixing devices for blending, mixing and masticating material have been used for many years in an attempt to more efficiently blend a variety of different ingredients into a homogenous consistency. These devices have been used for both industrial and domestic purposes, and are most widely known to reduce foods such as meats, fruits, vegetables, and the like into micro-particles for the preparation of different types of foods.

In terms of mixing and liquefying, the most critical feature of the blending device, and the one design feature which mainly determines the effectiveness of the device, is the blender blade. Blender blades have taken various forms in order to achieve a more efficient design, among which, include a propeller shape, U.S. Pat. No. 5,407,272 to Meier, a multi-tiered shape, U.S. Pat. Nos. 3,139,917 and 4,813,787 to Elmore and Conn, respectively, and a claw shape, U.S. Pat. No. 4,004,786 to Stephens. The goal of these blender blade designs is to chop food particles into fine pieces to produce a more thoroughly blended, greater refined and homogenous mixture.

In the past, blenders have been mainly used to finely grind and chop food. It has since become popular, however, to stir ingredients such as fruits, nuts, chocolate chips, and the like into thick confections such as milkshakes and ice cream, while substantially retaining the ingredients' integrity, in order to provide a textured and heterogenous consistency. While the prior art blender blade designs perform the function of chopping, thereby breaking down the ingredient integrity, a simple and inexpensive device is needed to mix ingredients into foods without transforming the mixture into a homogenous blend.

SUMMARY OF THE INVENTION

Generally, the present invention provides a blender blade to be used in a mixing device that stirs and blends ingredients into mixture without grinding or chopping the ingredients into a homogenous consistency. The present invention produces a mixture that retains a textured and heterogenous consistency by substantially maintaining the integrity of the ingredients added.

A first embodiment of the present invention comprises at least one wavy configured blade engaging an upper end of a shaft. The shaft has an lower end which engages a base plate for securement inside a conventional mixing device, such as a blender jar.

A second embodiment of the present invention comprises at least one top agitating blade and at least one lower wavy blade engaging a shaft at an upper end of the shaft. The shaft has a lower end which engages a base plate for securement inside a conventional mixing device, such as a blender jar.

Other details and advantages of the present invention will become apparent from the following detailed description of the presently preferred embodiments of practicing the invention.

BRIEF DESCRIPTION OF THE DRAWINGS

In the accompanying drawings, preferred embodiments of the invention and preferred methods of practicing the invention are illustrated in which:

FIG. 3 is a top view of the top blade of the blender blade as a pre-formed blank.

FIG. 4 is a prospective view of the top blade of the blender blade in its formed shape illustrated in FIG. 1.

FIG. 5 is a side view of the top blade of the blender blade in its formed shape illustrated in FIG. 1.

FIG. 6 is a top view of the wavy blade of the blender blade of the present invention illustrated in FIG. 1.

FIG. 7 is a cross-sectional view of the wavy blade taken along line VII—VII illustrated in FIG. 6.

FIG. 8 is a view of the wavy blade of the blender blade rotated 90 degrees on its side.

FIG. 9 is a prospective view of the wavy blade of the blender blade illustrated in FIG. 1.

DETAILED DESCRIPTION OF THE PREFERRED EMBODIMENT

The present invention is described with respect to the preferred physical embodiments constructed in accordance herewith. It will be apparent to those of ordinary skill in the art that various modifications and improvements may be made without departing from the scope and spirit of the invention. Accordingly, the invention is not limited by the specific embodiments illustrated and described, or objects or advantages thereof, but only by the scope of the appended claims, including all equivalents thereof.

Figure 2:
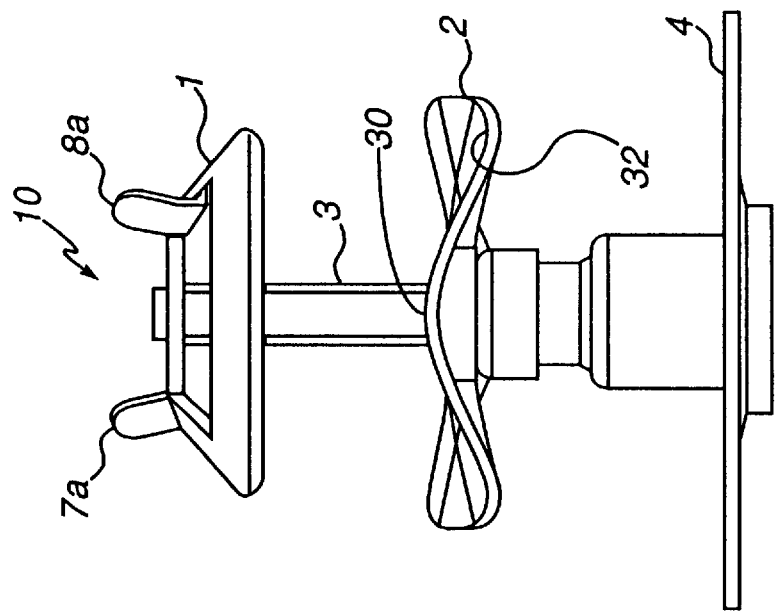
FIG. 2 is a side view of the blender blade illustrated in FIG. 1.
Figure 1:
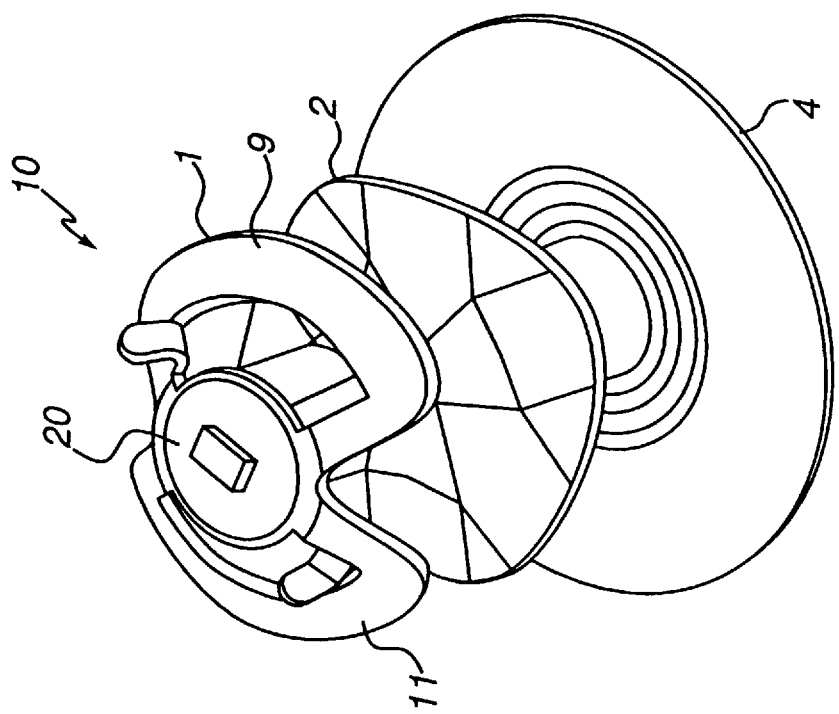
FIG. 1 is an isometric view of a blender blade of the present invention.

As illustrated in FIGS. 1 and 2, the present invention is directed to an agitator, such as a blender blade 10 comprising, generally, a top agitating blade 1 and a bottom undulate or wavy blending blade 2 mounted to a shaft 3 which extends downwardly to a base plate 4 for securement inside a blender vessel. It is contemplated that the present invention will be used in association with a conventional kitchen device for blending food materials. No particular type of blender vessel is necessary, as the present invention may accommodate any conventional blender vessel.

As illustrated in FIGS. 1, 2 and 3 of the drawings, the top agitating blade 1 is formed from any conventional metal process, including forming or pouring, but is preferably formed from a stamped blank. The top blade 1 may be constructed of any resilient material suitable for blending ingredients in a mixture, such as any food-safe metal, including but not limited to, stainless steel, aluminum, plated steel or the like, but is preferably stainless steel. The top blade 1 has a thickness ranging from 0.025 to 0.07 inches, but is preferably about 0.047 inches thick when stainless steel is the material employed. The top blade 1 is preferably tumbled to remove sharp edges and burrs.

The top blade 1 is preferably symmetrical and dog-bone shaped, having two opposing lobe portions 9 and 11. The two lobe portions 9 and 11 curve inwardly to form a narrow middle portion 13, which connects the lobes 9 and 11 to a central hub 20. Internal to the top blade 1 are two shaped apertures 5 and 6, and one central aperture 12. Edges 5a, 5b and 6a, 6b forming apertures 5 and 6, respectively, are preferably concentric or evenly spaced from the outer edge of each lobe portion 9 and 11, respectively, and have extended portions 7 and 8, respectively, on one end. The extended portions 7 and 8, as illustrated in FIGS. 2, 4 and 5, include generally upwardly extending flange portions 7a and 8a, respectively, which extend above hub 20. The extended portions 7 and 8 aid in the agitation and aeration process, as described below. Central aperture 12 is included through the hub 20 and is suitably sized for receiving the shaft 3 which is connected to a motor which permits the shaft 3 and top blade 1 to rotate.

As illustrated in FIGS. 1, 2, 4 and 5, in its final formed shape, top blade 1 is concave relative to the base plate 4, and includes upwardly turned extended portions 7 and 8, and downwardly extending lobe portions 9 and 11.

As the shaft 3 spins, the top blade 1 rotates, performing two functions. First, the top blade 1 agitates the mixture and pulls the ingredients from the top of the mixture downwardly to be mixed. Second, the top blade 1, including the extended portions 7 and 8 and the apertures 5 and 6, respectively, cause air to be pulled downwardly into the mixture to provide an aerated mixture.

As illustrated in FIGS. 1, 2, 6–9, the bottom mixing blade 2 is formed from any conventional metal process, including forming or pouring, but is preferably formed from a solid stamped blank. The bottom blade 2 may be constructed of any resilient material suitable for blending ingredients in a mixture, such as any food-safe metal, including but not limited to, stainless steel, aluminum, or plated steel, but is preferably stainless steel. The bottom blade 1 has a thickness preferably ranging from 0.04 to 0.085 inches, but is more preferably about 0.062 inches thick when stainless steel is the material employed. The bottom blade 2 is preferably tumbled to remove sharp edges and burrs.

Similar to the top blade 1 described previously, the only true limitation on the size of the bottom blade 2 is that it be smaller than the inside diameter of a conventional blender vessel. The bottom blade 2 is undulating or wavy, which causes the ingredients to be blended relatively more gently than the prior art blender blades, which tend to homogenize the ingredients.

As illustrated in FIG. 6, the bottom blade 2 is preferably rounded, and more preferably circular, and has a wavy or undulating configuration. The bottom blade 2 is preferably solid except for an aperture acting as a central hub 42, i.e., including no apertures such as 5 and 6 of the top blade, thereby reducing the shearing effect through the mixture, thereby acting to blend and stir, rather than chop, the ingredients to be mixed into the mixture. Although not required, the bottom blade 2 preferably does not include a tapered outer edge, as this edge would tend to masticate ingredients in the mixture. The lack of a tapered edge on the bottom blade 2 more effectively allows the ingredients to be rolled and blended into the mixture, thereby providing a heterogenous, textured consistency. As a result, popular ingredients which are typically added to a milkshake such as chocolate chips, fruit, nuts, M&M's®, chunks of candy bars and sprinkles are stirred into a milkshake, for example, while retaining much of their integrity.

As illustrated in FIGS. 6 and 9, the bottom blade 2 preferably includes a plurality of upwardly and downwardly projecting undulations 22 which are preferably equally spaced along their center lines 23 from each other. In a preferred embodiment there are six undulations 22 spaced 60 degrees apart on their center lines, three undulations 22 extending upwardly and separated by three undulations 22 extending downwardly. More or less undulations could, of course, be employed, but it is preferred that an even number of total undulations be provided, with half extending upwardly and half extending downwardly. As illustrated, for example, in FIG. 2, the undulations 22 are smoothly contoured such that the crest 30 of one undulation smoothly transitions into the trough 32 of an adjacent undulation.

As illustrated, the blade 2 is preferably symmetrical, both when viewed from the top as in FIG. 6, and when viewed in cross section as in FIG. 7. Although the relative dimensions of the bottom of blade 2 may vary, in a preferred embodiment, the blade has a diameter of about 1.5 to 2.0 inches and preferably about 1.87 inches. The width of the blade 2 from its highest wave point to its lowest wave point, identified as x in FIG. 8, is about 0.25 to 0.5 inches, and preferably about 0.316 inches. Each undulation 22 typically has a radius of curvature of about 0.943 inches which, in a preferred embodiment, causes the undulations 22 to extend about 0.273 inches downwardly or upwardly from an imaginary plane passing through the center of the blade 2 when viewed from the side, identified as y in FIG. 7.

Figure 10:
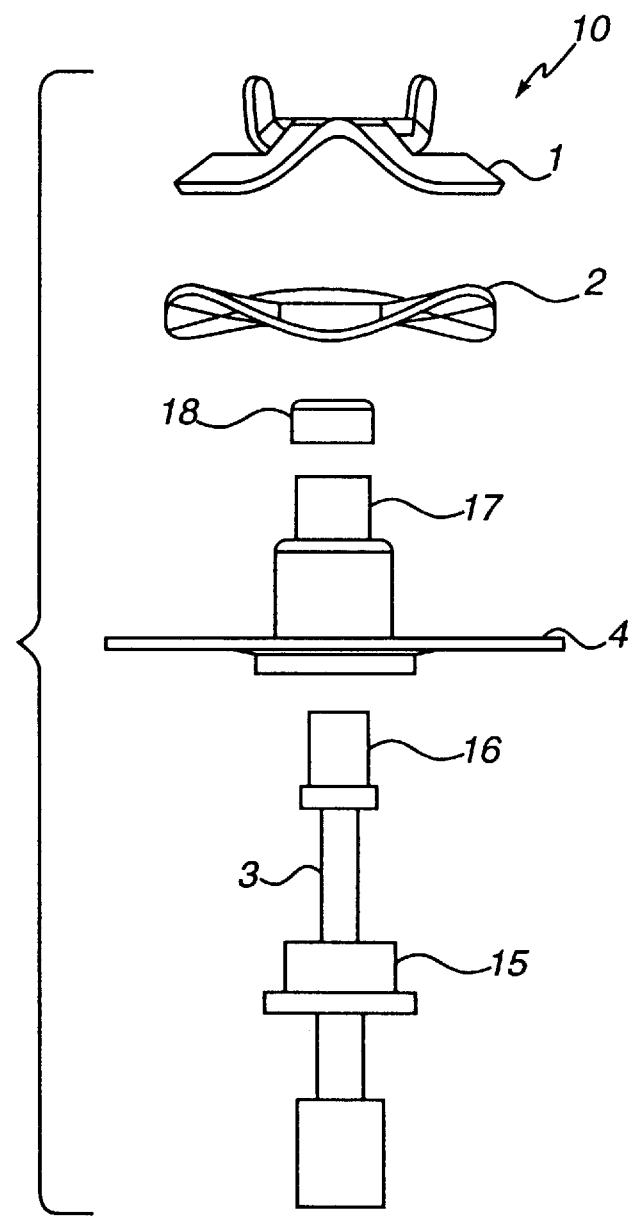
FIG. 10 is an exploded view of the blender blade illustrated in FIG. 1.

As illustrated in FIG. 10, the blades 1 and 2 are preferably connected to the shaft 3 as follows. The shaft 3 is preferably fitted with a bearing 15 at its base and a second bearing 16 at its uppermost portion for receiving a diaphragm 17. A ferrule 18 is slipped over the diaphragm 17, and the wavy or undulate blade 2 is placed thereover. The assembly is completed by placing the upper blade 1 over the shaft 3 as illustrated and fastening it thereto in known manner, such as by pressfit.

It is contemplated that although two blades 1 and 2 are preferred as shown in FIGS. 1 and 2, any number of top and bottom blades may be used. The inclusion of additional blades may reduce the amount of time needed to blend the ingredients in the mixture, but would result in additional manufacturing costs, and may result in a more thorough breakdown of the ingredients of the mixture, which would be opposite the goal of the present invention. It is further contemplated that additional blades may be used along with a slower speed of rotation, thereby reducing the possibility of breakdown of ingredients.

Although the invention has been described in detail in the foregoing for the purpose of illustration, it is to be understood that such detail is solely for that purpose and that variations can be made therein by those of ordinary skill in the art without departing from the spirit and the scope of the invention as defined by the following claims, including all equivalents thereof.

I claim:

1. An agitator for use in a mixing device for mixing ingredients throughout a fluid, comprising:

at least one top aerating blade, said at least one top blade having a plurality of generally upwardly extending portions and apertures adjacent thereto for drawing fluid downwardly into the mixing device and aerating the fluid;

at least one lower wavy blade, said at least one lower blade being formed from a solid blank but for a central hub so that rotation of said lower blade limits homogenization of the ingredients;

a shaft having an upper and lower end, said shaft engaging said at least one top blade and said at least one lower wavy blade at said upper end such that rotation of said shaft rotates said at least one top blade and said at least one lower wavy blade; and a base plate for engaging said shaft at said lower end, said base plate suitably sized to engage the mixing device.

2. The agitator of claim 1 wherein said top blade comprises two opposing lobe portions, each lobe portion having one upwardly extending portion and one of said apertures, the lobe portions curving inwardly to form a narrow middle portion.

3. The agitator of claim 2 wherein said top blade is concave relative to said base plate.

4. The agitator of claim 1 wherein said wavy blade is defined by undulate portions having upwardly extending undulate portions and downwardly extending undulate portions, each upwardly extending undulate portion being adjacent a downwardly extending undulate portion.

5. The agitator of claim 4 wherein the wavy blade is circular.

6. An agitator for agitating ingredients throughout a fluid in a blender, said agitator including a shaft on which is disposed a top aerating blender blade and a lower mixing blender blade, said top and lower blender blades being spaced apart from one another by a predetermined distance, said top blender blade including a central hub and a pair of lobes extending from said hub, said bottom blender blade being formed from a solid blank but for a central hub, said bottom blender blade including a plurality of undulate portions, said undulate portions comprise upwardly extending undulate portions and downwardly extending undulate portions, each upwardly extending undulate portion being adjacent a downwardly extending undulate portion.

7. An agitator for use in a mixing device for mixing ingredients into a fluid, comprising:

a top aerating blade, said top blade having two lobed portions that curve inwardly to form a narrow middle portion, each lobe having at least one generally upwardly extending portion and one adjacent aperture for drawing fluid downwardly into the mixing device and aerating the fluid;

a lower undulate blade, said lower blade being formed from a circular solid blank but for a central hub so that rotation of said lower blade prevents homogenization of the ingredients into the fluid;

a shaft having an upper and lower end, said shaft engaging said top blade and said lower undulate blade at said upper end such that rotation of said shaft rotates said top blade and said lower undulate blade, and a base plate for engaging said shaft at said lower end, said base plate suitably sized to engage the mixing device.

* * * * *